May 18, 1965 H. W. MERGLER 3,184,663
PLURAL PULSE RESPONSIVE MOTOR SYNCHRONIZING CONTROL
SYSTEM WITH UNIFORM PULSE SPACING
Filed July 25, 1960 2 Sheets-Sheet 1
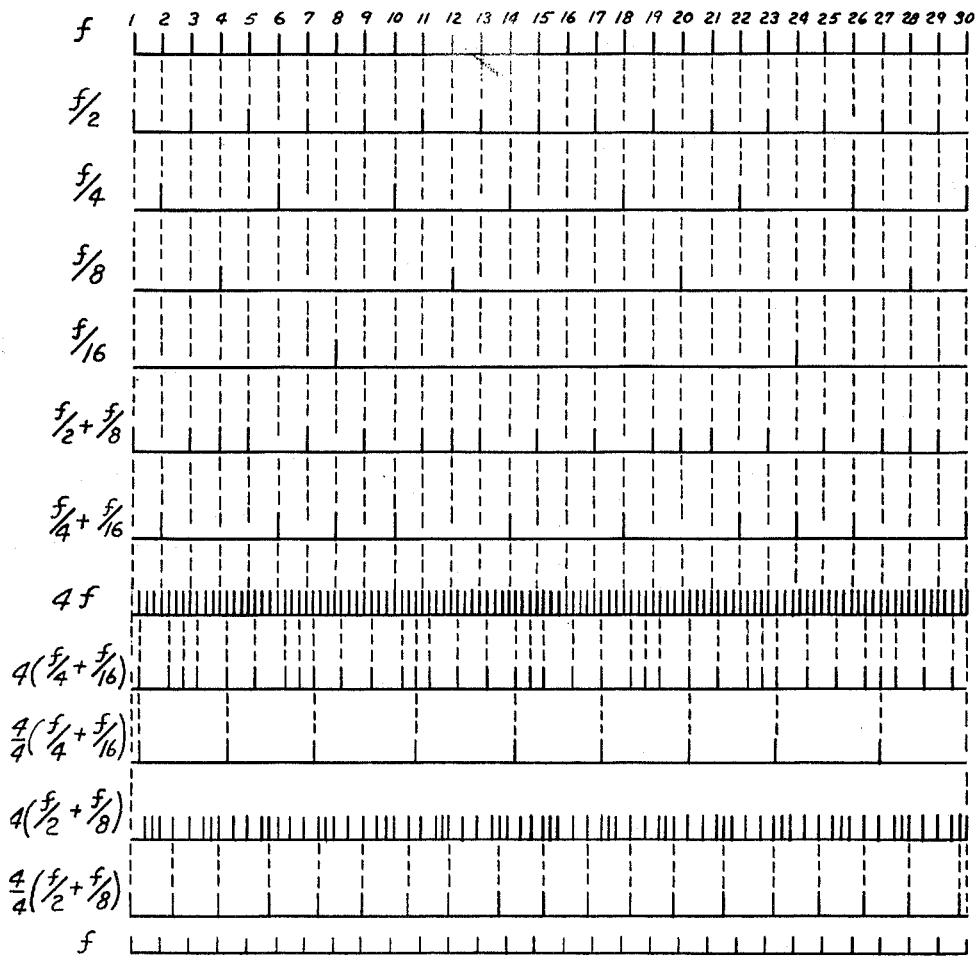
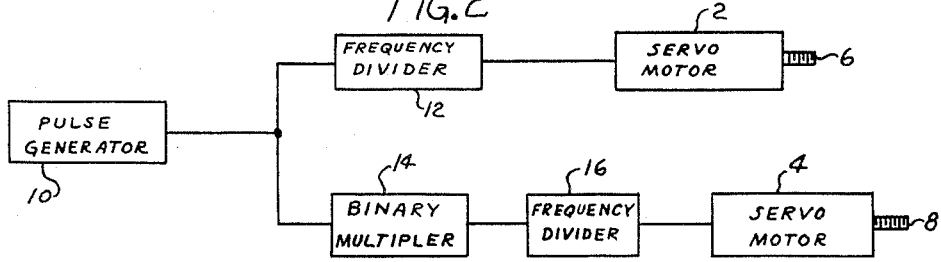
FIG. 1
INVENTOR.
HARRY W. MERGLER
BY
ATTORNEYS

United States Patent Office 3,184,663
Patented May 18, 1965

3,184,663
PLURAL PULSE RESPONSIVE MOTOR SYNCHRONIZING CONTROL SYSTEM WITH UNIFORM PULSE SPACING
Harry W. Mergler, Cleveland, Ohio, assignor to The Warner & Swasey Company, Cleveland, Ohio, a corporation of Ohio
Filed July 25, 1960, Ser. No. 45,143
3 Claims. (Cl. 318—39)

This invention relates to pulsing systems and particularly to the production of train of pulses of predetermined frequency or number with the pulses substantially uniformly or equally spaced for application to a translating device such as a pulse-responsive servo system.

In many applications it is desired to operate a pulse-responsive translating device in accordance with a characteristic of a train of pulses applied thereto. In certain systems it is desirable that the pulses applied to the translating device employed by substantially uniformly or equally spaced.

The problem of providing a train of pulses wherein the pulses are substantially uniformly or equally spaced is particularly troublesome in systems wherein the pulse train applied to the translating device is derived from certain types of frequency multiplier circuits and has a frequency or number of pulses which is a fraction of a predetermined frequency or the number of pulses of another pulse train applied to the multiplier circuit. In certain applications a multistage binary counting circuit is utilized to produce a plurality of pulse trains having different frequencies, or number of pulses therein, fractionally related to the frequency or number of pulses of an input pulse train and the pulses of each of the fractionally related pulse trains are phase displaced relative to the pulses of the other fractionally related trains so that no two pulses occur at the same time. When two or more of the fractionally related pulse trains are added to one another it is observed that the resulting pulse train includes pulses which are unequally spaced. If the resulting pulse train is applied to a translating device such as a servomotor the motor may not operate in the most desirable or acceptable manner due to the inequality of the pulse spacing.

A particular example is found in the digital control of machine tools wherein a tool-supporting cross slide and a cross slide-supporting carriage are moved along coordinate axes in response to operation of separate servo systems which are controlled by a record such as a tape control so that the tool is moved along a predetermined path which is the resultant of the coordinate axes. A system of this type is shown and described in application Serial No. 16,545, filed March 21, 1960, by Harry W. Mergler and assigned to the assignee of the present invention.

In the system described in the aforementioned application a pulse train of a predetermined frequency or pulse rate proportional to the rotational speed of the work-supporting spindle is applied to one servo system and the number of pulses in the train digitally represents one of the coordinates of a point toward which the tool is to be moved, and another pulse train is applied to another servo system and has a frequency or pulse rate which is related to the frequency or pulse rate of the one train as a fraction of the ratio of the coordinates. This latter pulse train is conveniently obtained from a multiplier circuit including a multistage binary counter circuit to which the pulse train having the frequency which is proportional to spindle speed is applied. Each stage of the binary counter circuit has an output connection on which a pulse train appears which pulse train has a number of pulses and frequency related to the input train by the fraction $\frac{1}{2^n}$ where $n$ is the number of the stage $x$. The output pulse trains produced by the several stages of the binary counter circuit have pulses which are phase displaced with respect to one another so that no two pulses occur at the same time.

A summation of two or more of the output trains is obtained in response to operation of a record controlled register included in the multiplier circuit such that a resulting output train is produced which has a frequency and number of pulses fractionally related to the frequency and number of pulses of the input train and the pulses of which are unequally spaced. It is desirable, however, that the pulses of the pulse train applied to the cross slide or carriage controlling servo system can be as evenly spaced as possible.

In the present invention an improved method and apparatus are provided to solve the above described problems and to derive from a multiplier circuit an ultimate pulse train having substantially uniformly or equally spaced pulses and having a frequency which is fractionally related to a predetermined frequency, the fractional relationship resulting from operation of the multiplier circuit which produces an output pulse train having non-uniformly or unequally spaced pulses.

According to the invention, a pulse train which is fractionally related in frequency and number of pulses to a given pulse train is produced by applying a pulse train which has a frequency and number of evenly spaced pulses which is a multiple of the frequency and number of pulses of the given pulse train to a multiplying circuit, such as a binary multiplying circuit, and the output pulse train produced by the circuit is divided by the predetermined multiple by a circuit which produces evenly spaced pulses in the output train when evenly spaced pulses are applied to the input. The frequency and number of pulses in the resulting pulse train is related to the predetermined frequency by the desired fraction and includes pulses having substantially equal spacing suitable for application to a servo system.

The multiple of the predetermined frequency is preferably a whole number and it is observed that the larger the multiple, the more uniform or equal is the spacing of the pulses of the ultimate train. The means utilized to divide the pulse train resulting from the multiplier circuit by the multiple may constitute any suitable dividing circuit. As an example, a binary counting circuit may be employed for this purpose as a scaler or divider and may include $x$ number of stages so that $2^x$ equals the whole number which constitutes the multiple. If the multiple is four, for example, then a two stage counting circuit is utilized as a divider or scaler to effect the frequency dividing operation.

It is, therefore, an object of the invention to provide an improved pulsing system which utilizes a multiplier circuit to derive an ultimate pulse train having substantially uniformly or equally spaced pulses and having a frequency and number of pulses which is fractionally related to a given pulse train having a predetermined frequency and number of pulses, which fractional relationship is obtained by operation of the multiplier circuit, the multiplier circuit being of the type which inherently produces an output pulse train having nonuniformly or unequally spaced pulses.

It is another object of the invention to provide a new and improved pulsing system for supplying a pulse train to a pulse-responsive servo system, which pulse train is to be related to a given pulse train in frequency and number of pulses by a fractional multiplier, the pulsing system including means for applying an input pulse train having a frequency and number of pulses which are a predetermined multiple of the frequency and number of pulses of the given pulse train to a binary multiplying circuit to multiply the input pulse train by the aforementioned multiplier, and means for dividing the frequency of the output pulse train by the predetermined multiple.

It is a further object of the invention to provide a pulsing system as defined in the preceding object wherein the predetermined multiple is a whole number.

It is still another object of the invention to provide an improved method of deriving an ultimate pulse train from circuit means including a binary multiplying circuit, which train has a frequency and number of pulses related to a predetermined frequency and pulse number by the fractional multiplier of the multiplying circuit and wherein, due to the operation of the multiplying circuit, the multiplied pulse train has an uneven spacing of the pulses therein, in which method the spacing of the pulses in the ultimate train is more even than the spacing of the pulses in the train at the output of the multiplying circuit.

Other objects of the invention will become apparent from the following description taken in conjunction with the accompanying drawings, in which:

FIG. 1 is a block diagram showing various parts of a pulsing system incorporating the present invention;

FIG. 2 is a graphical representation illustrating various pulse trains present in the system of FIG. 1.

Figure 3:
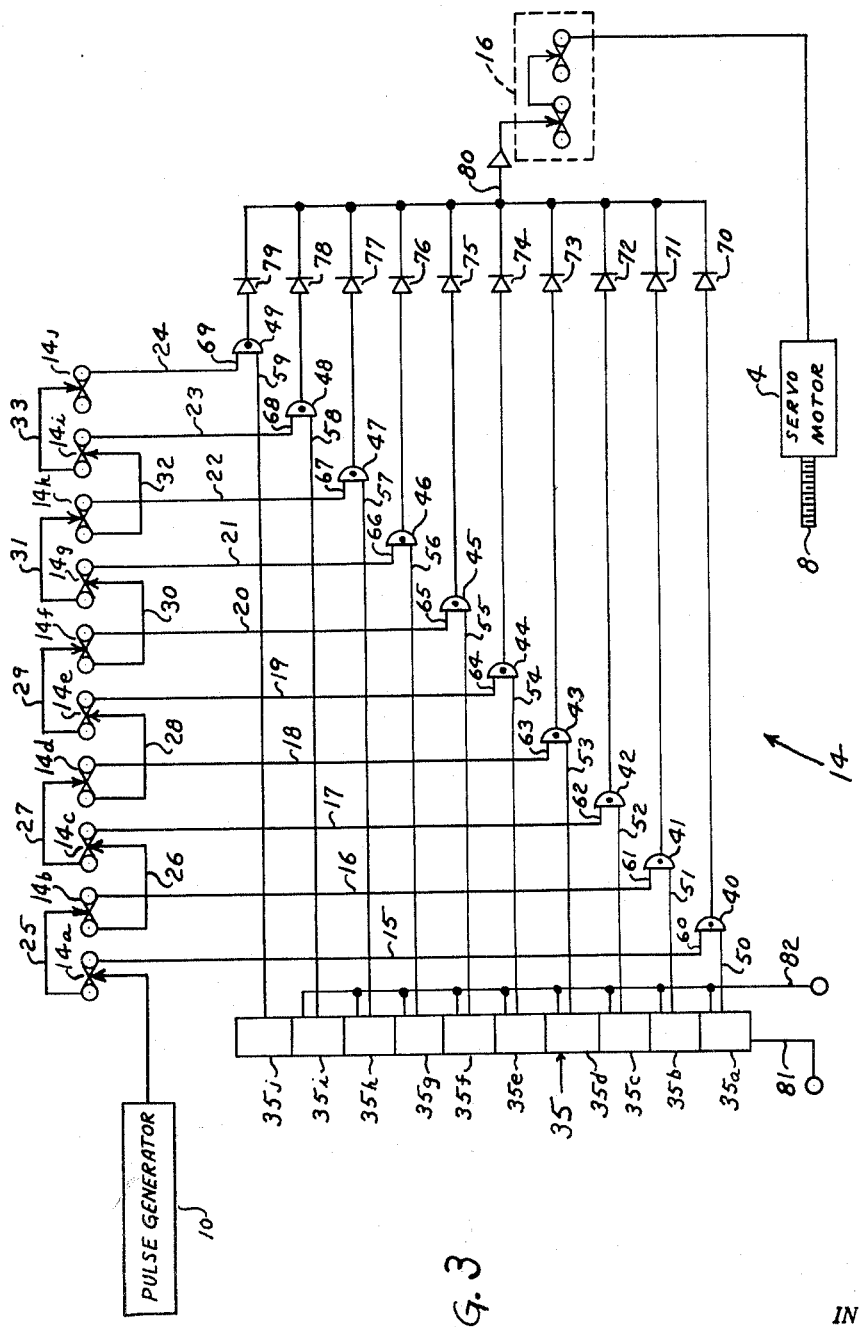
FIG. 3 is a schematic diagram of a portion of the system of FIG. 1 showing in particular details of a binary multiplier circuit.

While the present invention is susceptible of various modifications and constructions, it is particularly advantageous when embodied in a machine tool to effect the movements of elements thereof along coordinate axes in timed relation to the rotation of a work-supporting spindle. As an example, the present invention may be embodied in a lathe to effect movement of a tool to contour a workpiece in timed relation to the rotation of the spindle. For purposes of illustration the invention will be described as embodied in a lathe for the above stated purpose.

Referring now to the drawings, there is illustrated in FIG. 1 a block diagram showing various parts of a pulsing system embodying the teachings of the present invention. In the illustrated embodiment, the pulsing system includes a pair of servo systems represented by the blocks 2 and 4 which operate in response to the application of pulse trains thereto to effect a unit rotation of a pair of lead screws 6 and 8 for each pulse applied thereto. Such systems are well known in the art and effect rotation of the corresponding lead screws at an average rate related to the frequency of the applied train. The lead screws 6 and 8 may be operatively connected respectively to a tool-supporting cross slide (not shown) and a cross slide carriage (not shown) to effect movements of the slide and carriage.

The servo systems 2 and 4 may be of any suitable type such as the system including a stepmotor shown and described in United States Patent No. 2,922,940 or such as the system shown in the aforesaid application. The system is herein described as operating a servomotor in a single direction, but it is understood that the system can readily be adapted to operate a servomotor in two directions.

The lead screws 6 and 8 may be operatively connected to a cross slide carriage having a tool-supporting cross slide supported thereon and to the tool-supporting cross slide, respectively, the screw 6 effecting movement of the cross slide carriage parallel to the axis of a spindle for supporting and rotating a workpiece to be operated on by a tool on the cross slide, and the lead screw 8 effecting movemnet of the cross slide transversely of the axis of the workpiece.

The rotations of the lead screws 6 and 8 are controlled to move the cross slide and carriage in their respective directions in a correlated manner to produce movement of the tool along a path which describes the desired cut of the workpiece. In the schematic showing of FIG. 1, it is assumed that the lead screw 6 is to be rotated an angular amount which is greater than the angular rotation of the lead screw 8 to effect the desired resultant movement of the tool on the cross slide. Since the lead screws 6 and 8 are rotated a predetermined angular amount for each pulse applied to the servo systems 2 and 4, the number of pulses to be applied to the servo motor 4 must be a fraction of the number of pulses applied to the servomotor 2 and since the rates of movement of the cross slide and carriage must be correlated, the frequencies of the pulses applied to the servo motors 2 and 4 must be related by the same ratio as the ratio of the desired angular rotations of the motors. It can be seen, therefore, that if a pulse train having a frequency represented by $f$ is applied to the servomotor 2, then a pulse train represented by $f/A$ must be applied to the servomotor 4 to effect the desired resultant movement of the tool on the cross slide. In the disclosed system, a binary multiplying circuit 14 is provided to multiply a pulse train by the fraction $1/A$ to produce a pulse train to be applied to the servomotor 4 and which is properly related to the pulse train being applied to the servomotor 2.

Referring to FIG. 1, a pulse generator, designated by the block 10, is provided to generate a train of pulses having a predetermined frequency, preferably a frequency proportional to the rotational speed of the spindle for supporting and rotating the workpiece. The generator 10 may be of any conventional type capable of generating the desired frequency. In certain systems, the pulse generator 10 would normally operate to produce a pulse train having a frequency and number of pulses equal to the frequency and number of the pulses to be applied to the servomotor 2. In other known systems, the pulses which are applied to the servomotor 2 are also multiplied in a binary multiplying circuit or equivalent dividing circuit so that the servomotor 2 may be operated at different rates for a given frequency of pulses from the pulse generator. In this case, the frequency of the pulse generator 10 has been that necessary to provide the maximum frequency to be applied to the servomotors 2 and 4 when the multiplying circuits are set to multiply by the largest possible factor which is generally unity.

In accordance with the present invention, the pulses produced by the pulse generator 10 have a frequency greater than the frequency $f$ to be applied to the servomotor 2, or the maximum frequency $f$ which is to be applied to the servomotor 2 in the event that the pulses from the pulse generator are applied to the servomotor 2 through a multiplying circuit capable of multiplying the pulse train by various factors. In accordance with the preferred and illustrated embodiment, the frequency of the pulse generator 10, which shall be designated by the reference character F, is a multiple M of the frequency $f$. For the purposes of description, the multiple four has been chosen.

The train of pulses produced by the generator 10 is applied to a frequency dividing circuit such as a binary counting circuit designated by the block 12 and used as a scaling or dividing circuit for producing a pulse train having a frequency and number of pulses fractionally related to the frequency and number of pulses of the pulse train produced by the generator 10. The pulse train resulting from the counting circuit 12 is applied to the servo system 2.

The pulse train produced by the generator 10 is also applied to a binary multiplying circuit designated by the block 14 for producing a pulse train having a frequency related to the frequency of the train produced by the generator 10 by a predetermined fraction which is the fractional multiplier of the binary multiplying circuit 14. The pulse train produced by the circuit 14 is applied to a frequency dividing circuit designated by the block 16 which produces a pulse train having a frequency which is a fraction of the frequency produced by the binary multiplying circuit 14. The pulse train resulting from the dividing circuit 16 is applied to the servo system 4. Operation of the system above described will be set forth hereinafter.

Details of construction of the binary multiplying circuit 14 are illustrated in FIG. 3. As there shown, the circuit 14 includes a plurality of binary stages designated generally by the reference characters 14a through 14j and cascaded to form a counting chain. Each stage may comprise a bistable multivibrator of any conventional type, such as a transistor or vacuum tube multivibrator, which has two possible stable states or conductive conditions that may be designated as 0 and 1 respectively. Although ten stages are illustrated, it is understood that a greater or lesser number may be provided, as desired. Each stage is operative in response to the application of a triggering pulse thereto to switch from its immediate conductive condition or state to its other conductive condition. When one of the stages is triggered by the application of a pulse thereto and changes its conductive condition from a 0 condition to a 1 condition, an output pulse appears on the corresponding one of the output leads 15 through 24 associated respectively with the stages 14a through 14j.

Each of the stages, except the most significant stage, is interconnected to the following stages by a carry connection and these carry connections are designated by the reference numerals 25 through 33. When a particular stage is triggered and changes its conductive condition from 1 to 0, a carry pulse appears on the associated carry connection and this pulse is applied to the following stage to effect triggering of such following stage.

Let it be assumed that all of the stages are in a 0 conductive condition. When the stage 14a has a pulse applied thereto from the generator 10, this stage changes from its 0 condition to its 1 condition and a pulse from this stage appears on the output conductor 15. Thereafter, every other pulse from the generator 10 applied to the stage 14a produces an output pulse on the conductor 15. The second pulse applied to the stage 14a causes this stage to change from its 1 condition to its 0 condition, whereupon a carry pulse appears on the conductor 25 and is applied to the stage 14b. This carry pulse triggers the second stage 14b so that this stage changes from a 0 condition to a 1 condition, whereupon an output pulse appears on the conductor 16.

It is therefore seen that the application of a pulse train generated by the generator 10 to the circuit 14 results in the production of a number of pulse trains having different frequencies which are fractionally related to the frequency of the pulse train of the generator 10 with the pulses in each train being phase displaced relative to the pulses in the other trains so that no two pulses occur at the same time. The stage 14a produces a pulse train having a frequency which is one-half the frequency of the pulse train from the generator 10. The stage 14b produces a pulse train having a frequency which is one-fourth the frequency of the pulse train of the generator 10 and the following stages produce pulse trains having frequencies fractionally related to the frequency of the pulse train from generator 10 by the term $\frac{1}{2^n}$ wherein $n$ equals the significance of the particular stage in the circuit 14.

The operation of the circuit 14 may be understood with reference to FIG. 2, which is a grapical representation of pulse trains present in the pulsing system. FIG. 2 depicts a number of vertically arranged representations of pulse trains and the uppermost representation depicts a pulse train which will be assumed to have a frequency $f$ produced by the generator 10 and the pulses of which are equally spaced.

The frequency $f$ may be assumed, for purposes of discussion only, to be thirty pulses per unit of time and accordingly the pulse train produced by the stage 14a has a frequency $f/2$ which is fifteen pulses per unit of time. In a similar manner the pulse train resulting from the stage 14b has a frequency $f/4$ which is observed to be seven and one-half pulses per unit of time. Finally, the pulse trains resulting from the stages 14c and 14d have frequencies which are respectively $f/8$ and $f/16$.

It is noted that the pulses of the pulse trains resulting from the stages 14a through 14d are phase displaced relative to one another and that no two pulses occur at the same time. It is also observed that the pulses within each of the pulse trains resulting from the stages 14a through 14d are equally spaced.

The binary multiplying circuit 14 includes means for effecting the selective summation of output pulse trains produced by the stages 14a through 14j of the circuit 14. The purpose of the summation means is to provide a resulting pulse train which is a predetermined fraction of the frequency of the pulse train generated by the generator 10 which resulting pulse train is to be applied to one of the servo systems, such as the system 4. The summation operation is effected by a record controlled binary register, details of which are not necessary to an understanding of the present invention. However, a description of a register suitable for use in the pulse system of the present invention may be found in the aforementioned application.

The register is designated by the block 35 and includes a number of stages 35a through 35j corresponding to the stages 14a through 14j. Each of the stages 35a through 35j controls a separate one of a plurality of AND gates schematically represented by semicircles having dots therein, which semicircles are designated by the reference numerals 40 through 49. The AND gates may be of any conventional construction and include first input conductors 50 through 59 which are connected respectively to the stages 35a through 35j of the register 35 and second input conductors 60 through 69 connected respectively to the conductors 15 through 24 associated with the stages 14a through 14j of the circuit 14.

The pulse trains which are summed to provide the output pulse train from the binary stages 14a through 14j are selected by a register 35 which, in the preferred embodiment, is a binary shift register adapted to register a binary number which is indicative of the pulse trains which are to be summed and, in turn, of the multiplier by which the input train to the binary multiplying circuit is multiplied. The shift register is designated on the drawings by the block 35 and includes a plurality of binary stages 35a through 35j each adapted to have 1 or 0 registered therein and corresponding to the stages 14a through 14j.

Each of the stages 35a through 35j controls a respective one of a plurality of AND gates, designated by the reference numerals 40 through 49. The AND gates may be of any conventional construction and include first input conductors 50 through 59 which are connected, respectively, to the stages 35a through 35j of the register 35 and second input conductors 60 through 69 connected, respectively, to the conductors 15 through 24, respectively, associated with the stages 14a through 14j.

When a stage of the binary shift register 35 registers a binary 1, a voltage is applied to the corresponding one of the conductors 50 through 59 to condition the corresponding gate to pass pulses applied to the second input of the gate from the corresponding one of the stages 14a through 14j.

The operation of the AND gates is such that when an output pulse from one of the stages 14a through 14j of the circuit 14 is applied to the associated AND gate, an output pulse will appear at an output conductor of the gate if the gate is conditioned by the corresponding stage in the register 35 to pass the pulse. The output conductors of the gates 40 through 49 are connected through respective diodes 70 through 79 to an output conductor 80.

It is thus seen that the register 35 controls the pulse trains from the stages 14a through 14j which appear on the conductor 80 according to the number registered by the stages of the register 35. The register 35 may be controlled by a record, such as a tape, and the number to be registered may appear serially on an input connection 81 to the stage 35a of the shift register. After each character or bit has been set in the first stage 35a of the shift register, a pulse is applied to a shift connection 82 to shift the character or bit to the following stage of the register. Each time a pulse is applied to the connection 82, the digit registered in each stage of the shift register is shifted to the following stage. Accordingly, by applying a shift pulse after each bit, the number representative of the multiplier for the pulse train applied to the input of the binary multiplying circuit 14 is shifted into the register one bit at a time. Shift registers and their mode of operation are well known to those skilled in the art and, therefore, the shift register has not been described in detail.

Let it be assumed that it is desired to produce from the circuit 14 a pulse train having a frequency which is 5/8 the frequency $f$ or which has 5/8 the number of pulses of the train of frequency $f$. To this end the register 35 is set so that the stage 35a and the stage 35c condition the gates 40 and 42 to pass the pulse trains appearing on the output conductors 15, 17 of the stages 14a and 14c of the circuit 14. Accordingly, the AND gates 40 and 42 are open and the pulse trains from the stages 14a and 14c are passed through these AND gates and through the diodes 70 and 72 to the conductor 80. The resulting pulse train on the conductor 80 is depicted in FIG. 2 and has a frequency and number of pulses which is $f/2+f/8$. This frequency is 5/8 the frequency $f$ or approximately nineteen pulses per unit of time. It is observed, however, that the pulses of this pulse train are unequally spaced rather than of even spacing as is desirable for pulses which are to be applied to one of the servo systems, such as the system 4.

As a further example, it may be assumed that it is desired to produce a pulse train having a frequency or number of pulses which is 5/16 the frequency or number of pulses represented by $f$. To accomplish this the register 35 is set such that the stages 35b and 35d open the gates 41, 43 controlled thereby and the pulse trains from the stages 14b and 14d are passed to conductor 80. Accordingly, a resulting pulse train will appear on the conductor 80 which has a frequency or number of pulses equal to $f/4+f/16$. However, as shown in FIG. 2, this resulting pulse train has pulses which are unequally spaced and this is undesirable in a pulse train which is to be applied to the servo system 4. It is therefore seen that when any two pulse trains from the circuit 14 are added, the resulting pulse train includes unequally spaced pulses.

According to the present invention the pulsing system includes means for deriving from a multiplier circuit, such as the circuit 14, a pulse train having a frequency which is related to a predetermined frequency, e.g., the frequency of the pulses applied to the servomotor 2, by a selected fraction which is the summation of two or more fractions determined by operation of the binary multiplying circuit and which has pulses substantially equally spaced. In the present invention the generator 10 is selected to generate a frequency F which is a predetermined multiple of the frequency $f$ which is to be multiplied by a selected fraction by operation of the circuit 14. The pulse train having the frequency F is applied to the circuit 14 and the circuit 14 operates to multiply the frequency F by the selected fraction 1/A so that the resulting pulse train from the circuit 14 has a frequency $F/A$. The pulse train having this latter frequency is applied to the circuit 16 which operates to divide the frequency $F/A$ by the multiple M so that the resulting pulse train from the circuit 16 has a frequency $F/AM$. It is recognized that this latter frequency is equivalent to $f/A$ and this frequency is the desired frequency to be obtained for application to the system 4. It is also observed that the pulse train having this frequency includes pulses which are substantially equally spaced as compared to the output of the multiplying circuit 14 if a train of frequency $f$ were applied to the input thereof.

Referring again to FIG. 2, let it be assumed that the multiple M is four and that the generator 10 produces a pulse train having a frequency $4f$. Inasmuch as the frequency $f$ has been assumed to be thirty pulses per unit of time, the frequency $4f$ will be one hundred twenty pulses per unit of time. If it is desired to produce a pulse train for application to the system 4 having a frequency which is 5/16 the frequency $f$, then the register 35 is controlled so that the stages 35b and 35d are set to condition the corresponding gates to pass the pulse trains from stages 14b, 14d. With this arrangement a pulse train will appear on the conductor 80 which has the frequency $4(f/4+f/16)$. This frequency is equal to $5f/4$ which is equal to approximately thirty-seven and one-half pulses per unit of time. It is also noted that the pulses of the resulting pulse train are unequally spaced. This pulse train is then applied to the circuit 16 which is designed to divide the frequency thereof by the multiple four so that a pulse train having the frequency $4/4 (f/4+f/16)$ or approximately nine pulses per unit of time is produced by the circuit 16. It is noted with reference to the graphical representation of FIG. 2 that the pulses of the pulse train having the frequency $4/4 (f/4+f/16)$ are substantially equally spaced and that the frequency is the desired fraction of the frequency $f$.

As a further example let it be assumed that the generator 10 is producing a pulse train having the frequency $4f$ as in the previous example, and that the fraction desired is 5/8. Accordingly, the stages 35a and 35c are set to condition gates 40 and 42 to pass the pulse trains from the stages 14a and 14c so that a pulse train appears at the conductor 80 having a frequency which is $4(f/2+f/8)$. This frequency is two and one-half times the frequency $f$ which is equivalent to seventy-five pulses per unit of time. The pulse train having this latter frequency is applied to the circuit 16 which operates to divide the applied frequency by the multiple four so that a pulse train results from the circuit 16 having a frequency $4/4 (f/2+f/8)$. This pulse train has a frequency which is approximately nineteen pulses per unit of time which is the desired fraction 5/8 of the frequency $f$, and the pulses of this train are substantially equally spaced as can be seen from FIG. 2.

In the present invention the multiple M by which the frequency $f$ is multiplied at the generator 10 and by which the frequency from the circuit 14 is divided by the circuit 16 may comprise any whole number greater than unity. The circuit 16 may assume any suitable form effective to cause a frequency division by the whole number employed for the multiple M. If the multiple M is a power of 2 then the circuit 16 is conveniently in the form of a binary counting circuit which effects the division of the train by the factor. The number of stages of the counting circuit 16 is selected so that the frequency of the pulse train at the conductor 80 is divided by the multiple employed to multiply the frequency $f$ at the generator 10. For example, if the frequency generated by the generator 10 is four times the frequency $f$, then the circuit 16 must divide the frequency applied thereto by four. Accordingly, if the circuit 16 is a binary counting circuit it must have two stages. It will be noted that the circuit 16 is such that the output pulses from the circuit 16 are evenly spaced provided the input pulses are evenly spaced. As a further example, if the multiple M is eight then the counting circuit 16 must have three stages. This may be generalized by the equation $2^n=M$ wherein $n$ is the number of stages of the circuit 16. It is understood that circuit configurations other than binary counting circuits can be utilized for the circuit 16 to effect the proper frequency division, and such other circuits may be designed to divide by multiples which are odd whole numbers, such as 3, 5, 7, etc., provided the pulses of the output train are evenly spaced if the input pulses are so spaced. Such other circuits, for example, may include multi-cathode gas tubes.

In order that the servosystem 2 has applied thereto a pulse train having a frequency $f$ it is necessary to provide the frequency dividing circuit 12 which operates to divide the frequency F applied thereto from the generator 10 by the multiple M. For example, if it is assumed that the generator 10 produces a pulse train having a frequency F which is four times the frequency $f$ then the circuit 12 is designed to divide the frequency by four.

Although the invention has been described with reference to certain specific embodiments thereof, numerous modifications are possible and it is desired to cover all modifications falling within the spirit and scope of the appended claims.

Having described my invention,

I claim:

1. In a control system including first and second pulse-responsive servos to be operated in a predetermined relationship with respect to each other and each adapted to provide a unit of movement for each pulse applied thereto and wherein the pulses applied to the first servo are to be related to the pulses applied to the second servo by the factor $f/A$ where $f$ is the frequency of the pulses applied to the second servo and where A is the ratio of the movements of said servos to be effected by the pulses, pulse generating means for generating a first pulse train having a frequency $Mf$ where M is a whole number, means for applying said pulse train of frequency $Mf$ to said second pulse-responsive servo including a first dividing means for scaling the pulses applied thereto by the factor M, second circuit means for applying the pulses from said pulse generator to said first pulse-responsive servo including a binary multiplying circuit for multiplying the input pulses applied thereto by the factor $1/A$ and comprising output connections having individual pulse trains thereon which are respectively related in frequency and number of pulses to the pulses of the train applied to the input of the binary multiplying circuit by the factor $\frac{1}{2}^n$ where $n$ is a whole number with $n$ being different for each output connection, means for selecting and combining certain ones of said individual pulse trains to provide an output pulse train having a frequency and number of pulses related to the first train by the factor $Mf/A$, and second dividing means for scaling said output pulse train by the factor M, said first and second dividing means comprising a circuit having output pulses which are evenly spaced when evenly spaced input pulses are applied to the inputs of the circuits.

2. In a control system including first and second pulse-responsive servos to be operated in a predetermined relationship with respect to each other and each adapted to provide a unit of movement for each pulse applied thereto and wherein the pulses applied to the first servo are to be related to the pulses applied to the second servo by the factor $f/A$ where $f$ is the frequency of the pulses applied to the second servo and where A is the ratio of the movements of said servos to be effected by the pulses, circuit means for generating a first pulse train of frequency $f$, means for applying said first pulse train to said second pulse-responsive servo, including a binary circuit for multiplying the input pulses applied thereto by the factor $1/A$ and comprising output connections having individual pulse trains thereon which are respectively related in frequency and number of pulses to the pulses of the train applied to the input of the binary multiplying circuit by the factor $\frac{1}{2}^n$ where $n$ is a whole number with $n$ being a different number for each output connection, second circuit means for applying a second pulse train of frequency $Mf$ to said binary multiplying circuit where M is a whole number, means for selecting and combining certain ones of individual pulse trains to provide an output pulse train having a frequency and number of pulses related to the second pulse train by the factor $Mf/A$, and dividing means for scaling said output pulse train from said multiplying circuit by the factor M, said dividing means comprising a circuit having output pulses which are evenly spaced when evenly spaced input pulses are applied to the input of the circuit, and means for applying the pulses from said dividing means to said first servo.

3. In a control system including first and second pulse-responsive servos to be operated in a predetermined relationship with respect to each other and each adapted to provide a unit of movement for each pulse applied thereto and wherein the pulses applied to the first servo are to be related to the pulses applied to the second servo by the factor $f/A$ where $f$ is the frequency of the pulses applied to the second servo and where A is the ratio of the movements of said servos to be effected by the pulses, circuit means for generating a first pulse train of frequency $f$, means for applying said first pulse train to said second pulse-responsive servo, a multiplying circuit for multiplying the input pulses applied thereto by the factor $1/A$ and having output pulses which are unevenly spaced when evenly spaced input pulses are applied thereto, the number and frequency of the pulses in the pulse train output of said multiplying circuit being related to said input by the factor $1/A$, second circuit means for applying a pulse train of frequency MF to said multiplying circuit to provide an output pulse train from the multiplying circuit, and dividing means for scaling said output pulse train from said multiplying circuit by the factor M, said dividing means comprising a circuit having output pulses which are evenly spaced when evenly spaced input pulses are applied to the input of the circuit, and means for applying the pulses from said dividing means to said first servo.

References Cited by the Examiner

UNITED STATES PATENTS

| | | | |
|---|---|---|---|
| 2,870,429 | 1/59 | Hales | 318—162 X |
| 2,910,237 | 10/59 | Meyer et al. | 328—38 X |
| 2,910,638 | 10/59 | Linn | 318—341 X |
| 2,927,735 | 3/60 | Scuitto | 318—162 X |
| 2,938,132 | 5/60 | Schmid | 318—162 X |
| 2,943,251 | 6/60 | Hull | 318—162 |
| 2,945,997 | 7/60 | Kennedy | 310—49 X |
| 2,947,928 | 8/60 | Killian | 318—162 X |
| 2,968,797 | 1/61 | Sard et al. | |
| 3,002,115 | 9/61 | Johnson et al. | 318—162 X |
| 3,008,075 | 11/61 | Scott | 318—341 X |
| 3,036,223 | 5/62 | Phillips. | |
| 3,097,340 | 7/63 | Dobbie. | |

ORIS L. RADER, *Primary Examiner.*

MILTON O. HIRSHFIELD, JOHN F. COUCH,
*Examiners.*

UNITED STATES PATENT OFFICE
CERTIFICATE OF CORRECTION

Patent No. 3,184,663                        May 18, 1965

Harry W. Mergler

It is hereby certified that error appears in the above numbered patent requiring correction and that the said Letters Patent should read as corrected below.

Column 10, line 38, for "MF" read -- Mf --.

Signed and sealed this 28th day of September 1965.

(SEAL)
Attest:

ERNEST W. SWIDER
Attesting Officer

EDWARD J. BRENNER
Commissioner of Patents